(12) United States Patent
Otsubo (10) Patent No.: US 9,864,295 B2
(45) Date of Patent: Jan. 9, 2018

(54) OPTICAL SCANNING DEVICE AND COVER ATTACHED TO OPTICAL DEVICE

(71) Applicant: CANON KABUSHIKI KAISHA, Tokyo (JP)

(72) Inventor: Yoshitaka Otsubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/256,363

(22) Filed: Sep. 2, 2016

(65) Prior Publication Data

US 2017/0068181 A1   Mar. 9, 2017

(30) Foreign Application Priority Data

Sep. 8, 2015   (JP) ................................. 2015-176860

(51) Int. Cl.
| | | |
|---|---|---|
| G03G 15/04 | (2006.01) | |
| G02B 7/00 | (2006.01) | |
| G02B 27/00 | (2006.01) | |
| B41J 2/00 | (2006.01) | |
| G02B 26/12 | (2006.01) | |
| B41J 2/47 | (2006.01) | |
| G03G 21/16 | (2006.01) | |

(52) U.S. Cl.
CPC ........ *G03G 15/04036* (2013.01); *B41J 2/471* (2013.01); *G02B 7/00* (2013.01); *G02B 26/12* (2013.01); *G02B 27/0006* (2013.01); *G03G 15/0409* (2013.01); *G03G 21/1666* (2013.01); *G03G 2215/0404* (2013.01)

(58) Field of Classification Search
CPC ......... G03G 15/04036; G03G 21/1666; G03G 2221/1636; G03G 2215/0402; G03G 2215/0404; G02B 7/00; G02B 7/025; G02B 26/12; G02B 27/0006; H04N 1/00519; H04N 1/00551; H04N 1/00557; H04N 1/00559; B41J 2/471; B41J 2/473
USPC .......................... 399/118; 347/138, 245, 263
See application file for complete search history.

(56) References Cited

U.S. PATENT DOCUMENTS

| | | | | |
|---|---|---|---|---|
| 2009/0226213 | A1* | 9/2009 | Mogi ....................... | B41J 2/473 399/132 |
| 2013/0135419 | A1* | 5/2013 | Otoguro ........... | G03G 15/04036 347/224 |
| 2016/0147193 | A1* | 5/2016 | Yoshida ............. | H04N 1/00559 399/107 |
| 2016/0231690 | A1* | 8/2016 | Yoshida ............. | G03G 21/1619 |
| 2016/0246207 | A1* | 8/2016 | Iwai ....................... | H04N 1/113 |
| 2017/0052472 | A1* | 2/2017 | Otsubo ............. | H04N 1/00551 |
| 2017/0052474 | A1* | 2/2017 | Otsubo ........... | G03G 15/04036 |

FOREIGN PATENT DOCUMENTS

JP   2014-12368 A   1/2014

* cited by examiner

*Primary Examiner* — Robert Beatty
(74) *Attorney, Agent, or Firm* — Canon USA, Inc. I.P. Division (57) ABSTRACT

An upper cover attached to an optical box included in an optical scanning device includes a flow path in which a sealing member is injection-molded. The flow path includes a first bottom portion, a second bottom portion, and a step. The step is formed between the first bottom portion and the second bottom portion, and the area where the sealing member and the upper cover adhere to each other increases by an amount corresponding to the provided step so that adhesiveness between the sealing member and the upper cover is enhanced.

10 Claims, 6 Drawing Sheets

OPTICAL SCANNING DEVICE AND COVER ATTACHED TO OPTICAL DEVICE

BACKGROUND OF THE INVENTION

Field of the Invention

The present invention relates to an optical scanning device provided in an image forming apparatus.

Description of the Related Art

Conventionally, an image forming apparatus using an electrophotographic method scans a photosensitive drum whose surface has been charged to a uniform potential with a light beam corresponding to image information emitted from an optical scanning device, to form an electrostatic latent image. The formed electrostatic latent image is developed by a developer (toner) into a visible image. After a toner image as the visible image is transferred to a sheet, the unfixed toner image is fixed to the sheet by a fixing device, and the sheet is discharged. The optical scanning device, which performs scanning with the light beam, includes a deflection device including a rotating polygonal mirror for deflecting a light beam emitted from a semiconductor laser serving as a light emission source, and an optical system including an optical lens (fθ lens) and a reflecting mirror. In recent years, a demand for high-speed recording has increased in the image forming apparatus. A scanning speed in the optical scanning device has been increasing, i.e., high-speed rotation of the rotating polygonal mirror in the deflection device has been progressing. When the rotating polygonal mirror rotates at high speed, a positive pressure area and a negative pressure area occur on a mirror surface of the rotating polygonal mirror, and dirt such as minute dust and mist in air adheres to the mirror surface corresponding to the negative pressure area. When the dirt adheres to the rotating polygonal mirror, the reflectance of a portion to which the dirt has adhered is reduced. As a result, the light amount of the light beam emitted from the optical scanning device and deflected by the rotating polygonal mirror is reduced, which may cause inferior writing into the photosensitive drum, and may further cause deterioration in image quality on the sheet to which an image formed on the photosensitive drum is transferred.

To address such an issue, in the conventional optical scanning device, the following configuration ensures tight sealing of the optical scanning device. More specifically, an opening provided in an upper part of a housing (hereinafter referred to as an optical box) including an optical component is covered with a cover component (hereinafter referred to as an upper cover) covering the opening. At a portion where the optical box and the upper cover are in contact with each other, a sealing member including a soft sealing member such as a foam member is sandwiched therebetween. Further, the upper cover and the optical box are fastened to each other using a snap fit or a screw to press the sealing member in the sealing member, so as to ensure the tight sealing of the optical scanning device.

However, in this configuration, the upper cover may be deformed by a repulsive force of the pressed sealing member, and the sealing member may be worn out by being pressed continuously. Accordingly, the sealing property of the optical scanning device is deteriorated with the deformation of the upper cover and the wear-out of the sealing member. To prevent the deterioration in the tightness of the optical box, measures to reduce the deformation of the upper cover and the wear-out of the sealing member as much as possible have been proposed. For example, Japanese Patent Application Laid-Open No. 2014-12368 discusses an optical box having a plurality of fixing seating surfaces provided to fasten an upper cover to an optical box with a screw. In the optical box, the fixing seating surfaces to which the upper cover is fixed with a screw include high and low surfaces. The high fixed seating surface and the upper cover are fastened with a screw when the optical box starts to be used. The fixed seating surface is removable. When a sealing member is worn out, the upper cover is reassembled. At this time, the high fixed seating surface so far used is removed, and the upper cover is fixed with a screw to the low fixed seating surface. In such a manner, the upper cover can be fastened to the optical box even with the sealing member worn out. Further, when the high fixed seating surface is removed, and the upper cover is fixed with a screw to the low fixed sealing surface, the upper cover can be prevented from being deformed by a repulsive force from the fixed seating surfaces.

However, the above-described method does not reach a fundamental solution to the deformation of the upper cover caused by the repulsive force of the sealing member. A gap between the sealing member and the upper cover may occur with the deformation of the upper cover, other members may be separated with the deformation of the upper cover, and the sealing member may be separated from the upper cover. Therefore, measures against a decrease in dust-proof performance are insufficient.

SUMMARY OF THE INVENTION

According to an aspect of the present invention, an optical scanning device includes a light source configured to emit a light beam, a rotating polygonal mirror configured to deflect the light beam emitted from the light source so that the light beam deflected by the rotating polygonal mirror scans a photosensitive member, an optical member configured to guide the light beam deflected by the rotating polygonal mirror in the photosensitive member, an optical box to which the light source is attached and configured to contain the rotating polygonal mirror and the optical member, a cover configured to cover an opening of the optical box, and a fixing unit configured to fix the cover to the optical box, in which the cover includes a dust-proof member injection-molded into the cover to prevent dust from entering the optical box and sandwiched between the cover fixed to the optical box by the fixing unit and a top of a sidewall of the optical box, and the cover includes an inner peripheral wall, an outer peripheral wall, and a bottom portion connecting the inner peripheral wall and the outer peripheral wall, the inner peripheral wall and the outer peripheral wall forming a flow path for injection-molding the dust-proof member, the bottom portion including a first bottom portion, a second bottom portion shallower than the first bottom portion, and a connection surface connecting the first bottom portion and the second bottom portion.

Further aspects of the present invention will become apparent from the following description of exemplary embodiments with reference to the attached drawings.

DESCRIPTION OF THE EMBODIMENTS

An exemplary embodiment of the present invention will be specifically described below with reference to the drawings.

[Outline of Image Forming Apparatus]

Figure 1:
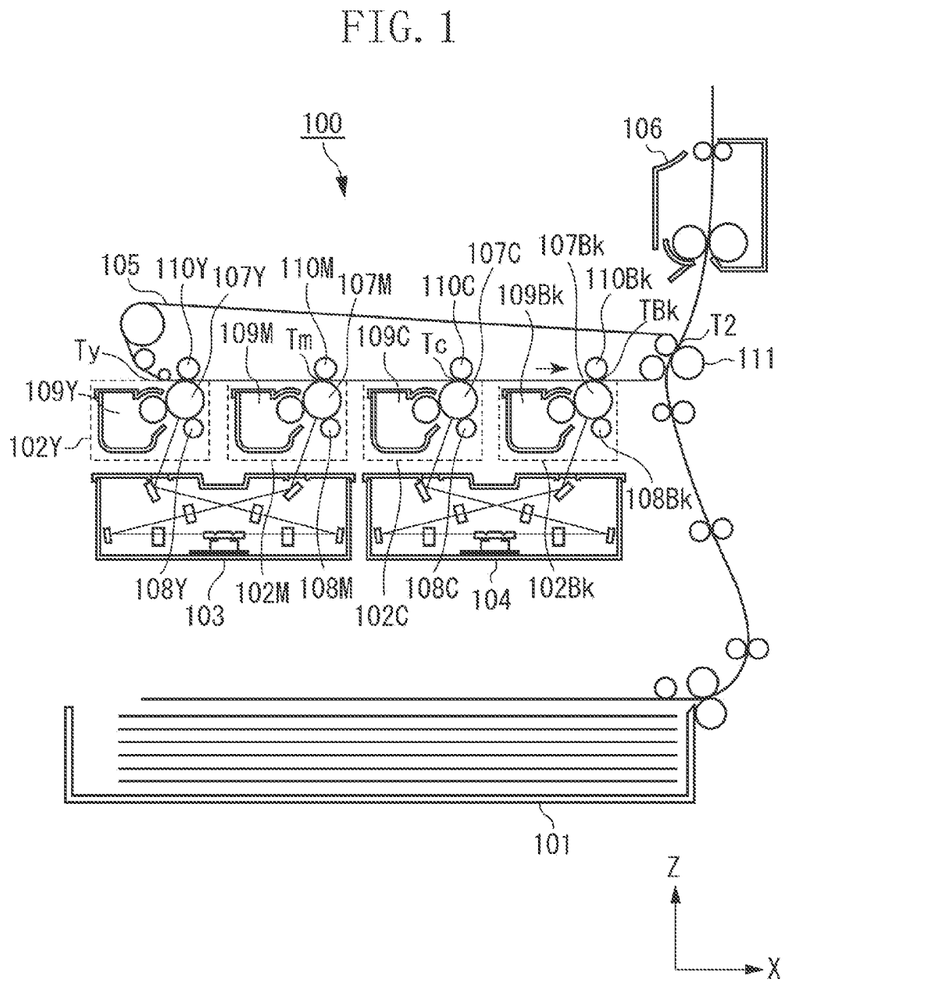
FIG. 1 is a schematic sectional view illustrating a configuration of an image forming apparatus according to an exemplary embodiment.

FIG. 1 is a schematic sectional view of an image forming apparatus 100, using an electrophotographic method, according to an exemplary embodiment. The image forming apparatus 100 illustrated in FIG. 1 includes a sheet feeding unit 101, image forming units 102Y, 102M, 102C, and 102Bk, optical scanning devices 103 and 104, an intermediate transfer belt 105, and a fixing device 106. The sheet feeding unit 101 feeds a sheet (also referred to as a recording sheet), and conveys the sheet to a secondary transfer portion T2. The optical scanning device 103 irradiates photosensitive drums 107Y and 107M in the image forming units 102Y and 102M, with light beams, to form electrostatic latent images on the photosensitive drums 107Y and 107M, respectively. The optical scanning device 104 scans photosensitive drums 107C and 107Bk in the image forming units 102C and 102Bk, to form electrostatic latent images on the photosensitive drums 107C and 107Bk, respectively. The image forming units 102Y, 102M, 102C, and 102Bk respectively form toner images in yellow (Y), magenta (M), cyan (C), and black (Bk) on the photosensitive drums 107Y, 107M, 107C, and 107Bk. Reference symbols Y, M, C, and Bk each representing a color of toner are omitted below, except when needed. The toner images each formed on a different one of the photosensitive drums 107 in the image forming units 102 are transferred to the intermediate transfer belt 105, and the toner images on the intermediate transfer belt 105 are collectively transferred onto the recording sheet fed from the sheet feeding unit 101, in the secondary transfer portion T2. The fixing device 106 fixes the unfixed toner image transferred onto the recording sheet, to the recording sheet.

The image forming units 102Y, 102M, 102C, and 102Bk in the image forming apparatus according to the present exemplary embodiment each includes the same components as the others, and hence the following description will be made with the image forming apparatus 102Y. In the following description, a direction of a rotational axis of a rotating polygonal mirror 205 (described below) is a Z-axis direction, a main scanning direction as a scanning direction of the light beam or a lengthwise direction of a reflecting mirror (described below) is a Y-axis direction, and a direction perpendicular to a Y-axis and a Z-axis is an X-axis direction.

The image forming unit 102Y includes the photosensitive drum 107Y serving as a photosensitive member, a charging device 108Y, and a developing device 109Y. When an image is formed, the charging device 108Y charges the surface of the photosensitive drum 107Y to a uniform potential. The optical scanning device 103 exposes the charged surface of the photosensitive drum 107Y with light, to form an electrostatic latent image. The electrostatic latent image is changed (developed) into a visible image with yellow toner supplied by the developing device 109Y, and a toner image is formed. In a primary transfer portion Ty, a primary transfer roller 110Y is disposed to oppose the photosensitive drum 107Y. When a predetermined transfer voltage is applied to the primary transfer roller 110Y, the toner image formed on the photosensitive drum 107Y (on the photosensitive member) is transferred onto the intermediate transfer belt 105. Similarly, the other color toner images on the photosensitive drums 107M, 107C, and 107Bk are transferred onto the intermediate transfer belt 105 by primary transfer rollers 110M, 110C, and 110Bk disposed in primary transfer portions Tm, Tc, and TBk, respectively.

In the secondary transfer portion T2, a secondary transfer roller 111 is disposed to oppose the intermediate transfer belt 105. When a predetermined transfer voltage is applied to the secondary transfer roller 111, the toner image on the intermediate transfer belt 105 is transferred onto the recording sheet serving as a recording medium that has been conveyed from the sheet feeding unit 101. The recording sheet onto which the toner image has been transferred is conveyed to the fixing device 106, and the unfixed toner image is heated by the fixing device 106, and is fixed to the recording sheet. The recording sheet that has been subjected to fixing processing by the fixing device 106 is discharged to a sheet discharge unit (not illustrated).

[Optical Path in Optical Scanning Device]

The optical scanning devices 103 and 104 will be described below. The image forming apparatus 100 according to the present exemplary embodiment includes the optical scanning device 103 that exposes the photosensitive drums 107Y and 107M with light and the optical scanning device 104 that exposes the photosensitive drums 107C and 107Bk with light. The optical scanning devices 103 and 104 have the same configuration, as illustrated in FIG. 1, and hence only the optical scanning device 103 will be described below.

Figure 2A:
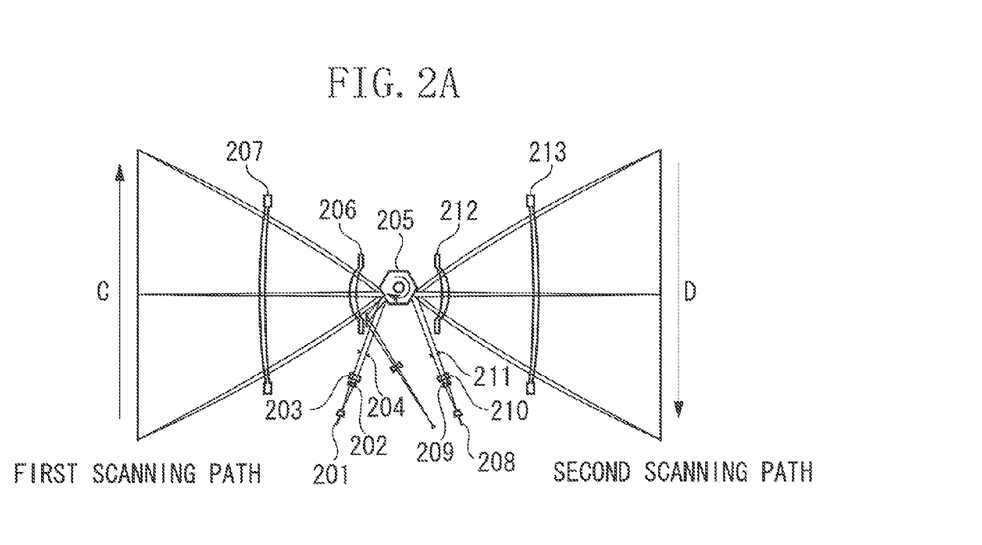
FIGS. 2A and 2B are a cross-sectional view illustrating main scanning of an optical scanning device according to an exemplary embodiment and a cross-sectional view illustrating a configuration of the optical scanning device, respectively.

FIG. 2A is a cross-sectional view of main scanning in which an optical path in the optical scanning device 103 that exposes the photosensitive drums 107Y and 107M with light is developed into one plane. A scanning direction with a laser beam caused by rotation of the rotating polygonal mirror 205 is referred to as a main scanning direction, and a direction orthogonal to the main scanning direction and perpendicular to the rotational axis of the rotating polygonal mirror 205 is referred to as a sub-scanning direction. A main scanning cross section is a plane parallel to the scanning direction of the laser beam and perpendicular to the rotational axis of the rotating polygonal mirror 205 (a plane having the rotational axis of the rotating polygonal mirror 205 as a normal).

As illustrated in FIG. 2A, the rotating polygonal mirror 205 deflects a laser beam emitted from a light source 201 leftward in FIG. 2A and deflects a laser beam emitted from a light source 208 rightward in FIG. 2A. As a result, the laser beam emitted from the light source 201 is moved to perform scanning in a direction indicated by an arrow C (a first scanning path), and the laser beam emitted from the light source 208 is moved to perform scanning in a direction indicated by an arrow D (a second scanning path).

In the first scanning path, the laser beam (light beam) emitted from the light source 201 is converted into parallel light by a collimator lens 202, and is converted into a laser beam that has converged in only the sub-scanning direction by a cylindrical lens 203 installed next to the collimator lens 202. The laser beam converged in only the sub-scanning direction is formed into a predetermined shape by a diaphragm 204, and is then image-formed in a linear shape on a reflection surface of the rotating polygonal mirror 205. The laser beam that has been image-formed on the reflection surface of the rotating polygonal mirror 205 is converted into a scanning beam to be emitted toward the photosensitive drum 107 by rotation in a direction indicated by an arrow in FIG. 2A (the clockwise direction) of the rotating polygonal mirror 205. Then, the surfaces of the photosensitive drums 107 are scanned with the scanning beams at a uniform velocity via fθ lenses 206 and 207 each serving as an optical member.

In the second scanning path, the laser beam (light beam) emitted from the light source 208 is converted into parallel light by a collimator lens 209, and is then converted into a laser beam that has converged in only the sub-scanning direction by a cylindrical lens 210 installed next to the collimator lens 209. The laser beam converged in only the sub-scanning direction is formed into a predetermined shape by a diaphragm 211, and is then image-formed in a linear shape on the reflection surface of the rotating polygonal mirror 205. The laser beam that has been image-formed on the reflection surface of the rotating polygonal mirror 205 is converted into a scanning beam to be emitted toward the photosensitive drum 107 by the rotation of the rotating polygonal mirror 205. Then, the front surfaces of the photosensitive drums 107 is scanned with the scanning beam at a uniform velocity via fθ lenses 212 and 213 each serving as an optical member.

[Configuration of Optical Scanning Device]

Figure 2B:
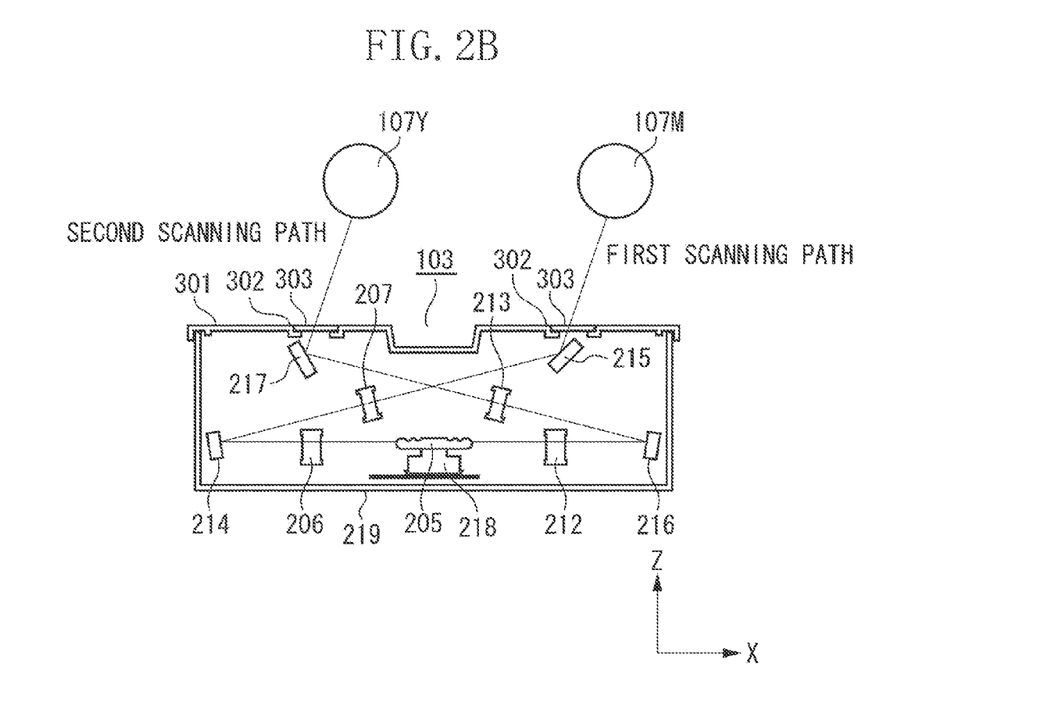

FIG. 2B is a cross-sectional view illustrating a configuration of the optical scanning device 103 that scans the photosensitive drums 107Y and 107M described with reference to FIG. 2A. In FIG. 2A, a description has been given of a cross-sectional view of main scanning in which an optical path of a laser beam that passes through an optical system including the lenses and the reflecting mirror (not illustrated in FIG. 2A), described below, is developed into a plane. In an actual optical scanning device, a three-dimensional optical path is formed with the reflecting mirror, as illustrated in FIG. 2B. In FIG. 2B, the rotating polygonal mirror 205 deflects the laser beam that has been emitted from the light source 201. The deflected laser beam is reflected by a reflecting mirror 214 serving as an optical member after passing through the fθ lens 206, and is guided to the fθ lens 207. The laser beam passed through the fθ lens 207 is reflected by a reflecting mirror 215, is guided to the photosensitive drum 107M, and scans the photosensitive drum 107Y.

On the other hand, the rotating polygonal mirror 205 deflects the laser beam that has been emitted from the light source 208. The deflected laser beam is reflected by a reflecting mirror 216 after passing through the fθ lens 212, and is guided to the fθ lens 213. The laser beam passed through the fθ lens 213 is reflected by a reflecting mirror 217, is guided to the photosensitive drum 107Y, and scans the photosensitive drum 107Y. The rotating polygonal mirror 205 is supported by a driving motor 218 while being driven to rotate by the driving motor 218. In the present exemplary embodiment, the rotating polygonal mirror 205 and the driving motor 218 form a deflection unit.

As illustrated in FIG. 2B, optical members, namely, the fθ lenses 206, 207, 212, and 213, the reflecting mirrors 214, 215, 216, and 217, the rotating polygonal mirrors 205, and the driving motor 218, are contained within an optical box 219 serving as a housing, and constitute the optical scanning device 103. The optical box 219 may be formed of a material reinforced by mixing a glass fiber with a synthetic resin (e.g., polycarbonate or polystyrene). An upper cover 301 is mounted on an opening in an upper part of the optical box 219 illustrated in FIG. 2B so that dust does not enter the optical box 219. The upper cover 301 is provided with an opening through which the laser beams each to be guided to the photosensitive drums 107Y and 107M pass, and a dust-proof glass 303 is installed on the side, opposing the photosensitive drum 107, of the opening so that dust does not enter the optical box 219 from the opening. The dust-proof glass 303 is fixed to the upper cover 301 with a double-sided tape 302.

[Appearance of Optical Scanning Device]

Figure 3A:
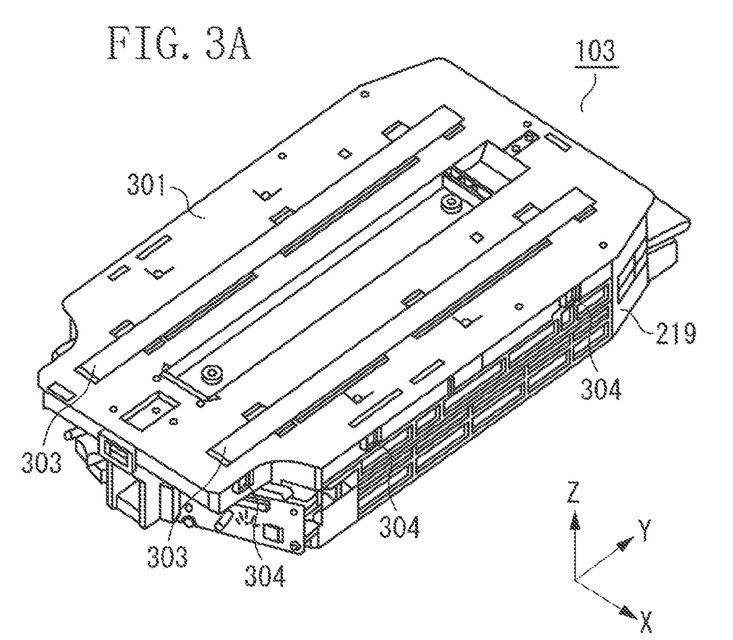
FIGS. 3A and 3B are perspective views illustrating a state where an upper cover in the optical scanning device according to an exemplary embodiment is mounted on an optical box and a state where the upper cover is removed from the optical box, respectively.
Figure 3B:
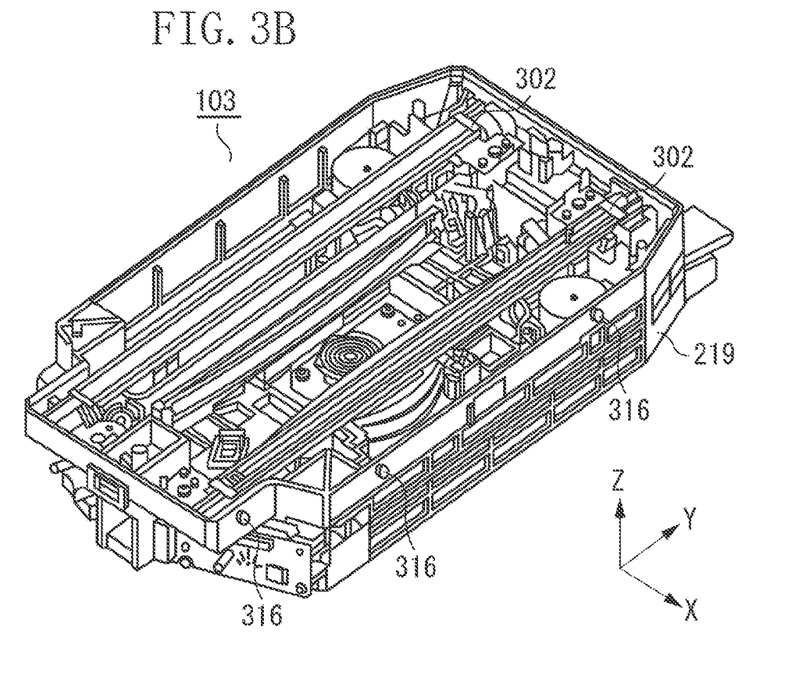

FIGS. 3A and 3B are perspective views each illustrating the appearance of the optical scanning device 103. FIG. 3A is a perspective view illustrating the appearance of the optical scanning device 103 with the above described upper cover 301 mounted on the optical box 219. FIG. 3B is a perspective view illustrating an internal configuration of the optical scanning device 103 with the upper cover 301 removed from the optical box 219. The dust-proof glass 303 fixed to the upper cover 301 with the double-sided tape 302 (FIG. 3B) in a frame shape is provided on the side, facing the photosensitive drum 107, of the upper cover 301. A laser beam passes through the dust-proof glass 303 toward the photosensitive drum 107. The double-sided tape 302 is provided in a frame shape along the outer periphery of the dust-proof glass 303 to fix the dust-proof glass 303 with the upper cover 301. Since the double-sided tape 302 hides in the dust-proof glass 303 in FIG. 3A, the double-sided tape 302 is illustrated in FIG. 3B to specify a location of the double-sided tape 302. Latching claws 304 (FIG. 3A) constituting a snap fit mechanism are arranged on the outer periphery of the upper cover 301. When protrusions 316 (FIG. 3B) each serving as a latching portion which constitutes a snap fit mechanism with a latching claw 304 engage the latching claws 304, the upper cover 301 can be mounted on the optical box 219.

[Outline of Sealing Member]

Figure 4:
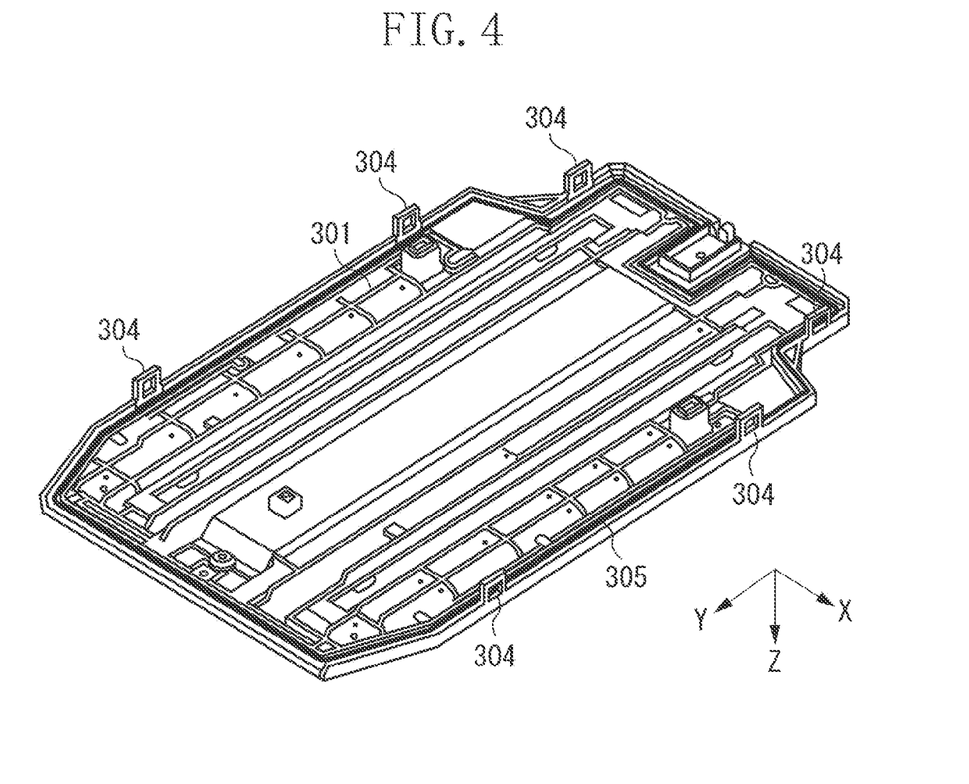
FIG. 4 is a perspective view illustrating a back surface of the upper cover according to an exemplary embodiment.

FIG. 4 is a perspective view illustrating a back surface of the upper cover 301, more specifically, a surface of the upper cover 301 opposing the optical box 219 when the upper cover 301 is mounted on the optical box 219. On the back surface of the upper cover 301, a sealing member 305 (a thick black portion in FIG. 4) is provided on the entire periphery of a portion in contact with a sidewall constituting an outer peripheral edge of the optical box 219 when the upper cover 301 is mounted on the optical box 219. The sealing member 305 is formed on the upper cover 301 by injecting a hot-melt adhesive serving as an elastic member into a space between the upper cover 301 and a mold contacting the upper cover 301, and is integrated with the upper cover 301. When the latching claw 304 provided to the upper cover 301 engages the protrusion 111 (FIG. 3B) provided on an outer side surface of the sidewall of the optical box 219, described above, the upper cover 301 is mounted on the optical box 219. When the sealing unit 305 serving as a dust-proof member is sandwiched between the optical box 219 and the upper cover 301, the inside and the outside of the optical box 219 are disconnected from each other via the sealing member 305 so that the optical box 219 is tightly sealed. Consequently, dust is prevented from entering the optical box 219.

[Shape of Sealing Member]

Figure 5:
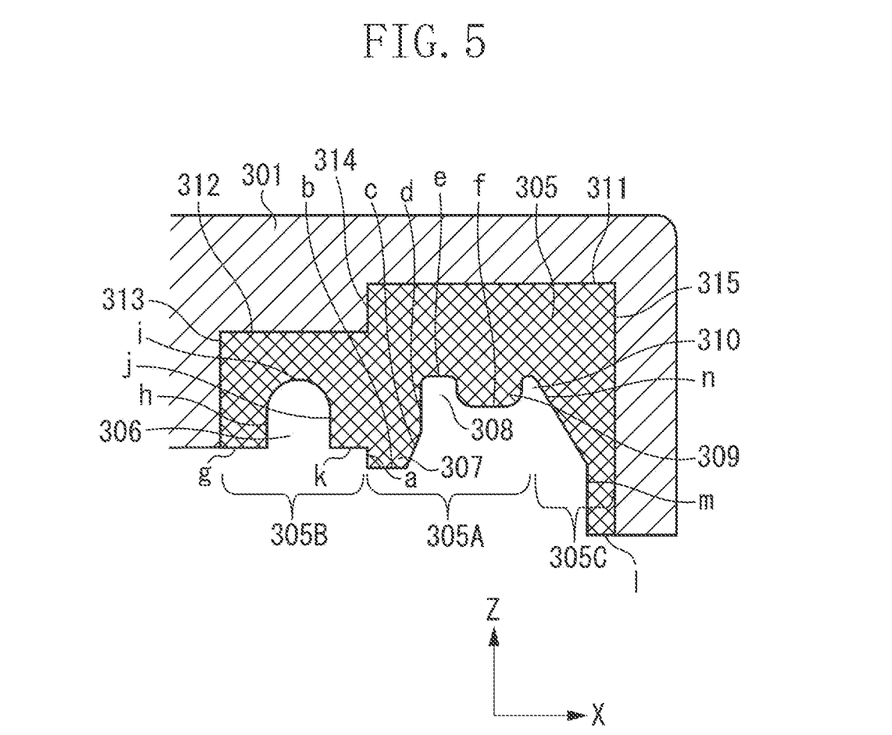
FIG. 5 is a cross-sectional view illustrating a shape of a sealing member according to an exemplary embodiment.

FIG. 5 is a schematic sectional view illustrating a cross-sectional shape in a widthwise direction of the sealing member 305 provided in the upper cover 301. In FIG. 5, the upper side is the side of the front surface of the upper cover 301, and the lower side is the side of the back surface, of the upper cover 301, opposing the optical box 219 when the upper cover 301 is mounted on the optical box 219. In FIG. 5, the right side corresponds to the outside of the optical box 219 when the upper cover 301 is mounted on the optical box 219, and the left side corresponds to the inside of the optical box 219 when the upper cover 301 is mounted on the optical box 219, in other words, the side on which the optical box 219 contains the rotating polygonal mirror 205 and the optical members.

The upper cover 301 includes a flow path for injection-molding the sealing member 305. As illustrated in FIG. 5, the upper cover 301 includes an outer peripheral wall 315 and an inner peripheral wall 313 that form the above described flow path. The upper cover 301 connects the outer peripheral wall 315 and the inner peripheral wall 313, and its bottom portion serving as the bottom of the flow path includes a first bottom portion 311 and a second bottom portion 312. A step 314 (a connection surface) is provided between the first bottom portion 311 and the second bottom portion 312, and the depth of the second bottom portion 312 is smaller than the depth of the first bottom portion 311. The step 314 is a surface connecting the first bottom portion 311 and the second bottom portion 312.

The sealing member 305 includes a sealing portion 305A serving as a contact portion pressed by contacting the sidewall of the optical box 219 when the upper cover 301 is mounted on the optical box 219, and sealing portions 305B and 305C each serving as a non-contact portion not contacting the optical box 219. The sealing portions 305B and 305C are provided on both sides of the sealing portion 305A. The sealing portion 305B is adjacent to the sealing portion 305A and is positioned on the inner side of the optical box 219 with respect to the sealing portion 305A, and includes a groove 306. The sealing portion 305C is adjacent to the sealing portion 305A and is positioned on the opposite side of the sealing portion 305B across the sealing portion 305A and on the outer side of the optical box 219 with respect to the sealing portion 305A.

(Sealing Portion 305A)

The sealing portion 305A is provided with projection portions 307 and 309 each having a projection in a direction toward the optical box 219 (−Z-axis direction, i.e., direction opposite to the Z-axis direction) and recess portions 308 and 310 each having a recess in the direction toward the optical box 219. The recess portion 308 is positioned between the projection portion 307 and the projection portion 309, and the recess portion 310 is positioned between the projection portion 309 and the sealing portion 305C. When the sealing portion 305A is viewed from a direction of the optical box 219, the sealing portion 305A has a configuration in which a groove portion formed by the recess portions 308 and 310 is partitioned by the projection portion 309 in an opening formed by the projection portion 307 and the sealing portion 305C.

The projection portion 307 is positioned at an end of the sealing portion 305A adjoining the sealing portion 305B, and has three surfaces a, b, and c. The surface a forms a standing wall portion that extends in the direction toward the optical box 219 when the upper cover 301 is mounted on the optical box 219, and adjoins the surface b and a surface k of the sealing portion 305B. The surface b adjacent to the surface a is a plane extending in the X-axis direction, and adjoins the surface c. The surface c adjacent to the surface b is a surface inclined in the +Z-axis direction (direction indicated by the arrow Z) and the +X-axis direction (direction indicated by the arrow X), and adjoins a surface d of the recess portion 308.

The projection portion 309 is positioned in the +X-axis direction from the center of the sealing portion 305A, in other words, near the sealing portion 305C, and has a surface f having a semicircular-shaped projection portion in the direction toward the optical box 219. The surface f has its one end adjacent (connected) to the recess portion 310 and its other end adjacent (connected) to the surface e of the recess portion 308. The height of the projection portion 309 (a height in the −Z-axis direction (the direction of the optical box 219) from a bottom surface, on the side of the upper cover 301, of the sealing member 305) is lower than the height of the surface b of the projection portion 307 (a height in the −Z-axis direction from the bottom surface, on the side of the upper cover 301, of the sealing member 305).

The recess portion 308 is positioned between the projection portion 307 and the projection portion 309, and has two surfaces d and e. The surface d forms a standing wall portion extending in the direction toward the optical box 219 when the upper cover 301 is mounted on the optical box 219. The surface d has its one end adjoining the surface c of the projection portion 307 and its other end located adjacent to the adjacent surface e. The surface e adjacent to the surface d is a plane extending in the X-axis direction (also a bottom surface of the recess portion 308), and adjoins the adjacent projection portion 309.

The recess portion 310 is positioned between the projection portion 309 and the sealing portion 305C. The recess portion 310 has its one end adjoining the surface f of the projection portion 309 and its other end adjoining a surface n of the adjacent sealing portion 305C.

(Sealing Portion 305B)

The sealing portion 305B includes a surface g, the groove 306, and a surface k. The surface g is a plane extending in the X-axis direction formed in such a manner that a bottom surface, opposing the optical box 219, of the upper cover 301 is extended. The groove 306 has three surfaces h, i, and j. The surface h is a surface adjacent to the surface g, forms a standing wall portion extending in a direction away from the optical box 219, and has its one end adjoining the surface g and its other end adjoining the surface i. The surface i has a surface having a semicircular-shaped recess portion in the direction away from the optical box 219. The surface i has its one end adjacent (connected) to the surface h and its other end adjacent (connected) to the surface j. The surface j is a surface adjacent to the surface k, forms a standing wall portion extending in the direction away from the optical box 219, and has its one end adjoining the surface k and its other end adjoining the surface i. The surface k is a plane extending in the X-axis direction formed in such a manner that the surface g is extended, and has its one end adjoining the surface j of the groove 306 and its other end adjoining the surface a of the projection portion 307 in the sealing portion 305A.

The width (the length in a widthwise direction) of the groove 306 indicates a distance in an opening of the groove 306, more specifically, a distance between the surface h and the surface j of the groove 306. The depth of the groove 306 indicates a distance from the opening of the groove 306, i.e., the surfaces g and k of the sealing portion 305B to a deepest portion of the surface i of the groove 306.

(Sealing Portion 305C)

The sealing portion 305C has surfaces l, m, and n. The surface l is a plane extending in the X-axis direction having a shape in which a plane at an end, in the direction of the optical box 219, of the upper cover 301 is extended and formed at an end, on the outer side of the optical box 219, of the sealing portion 305C. The surface m is a surface adjacent to the surface l, forms a standing wall portion extending in the direction away from the optical box 219 when the upper cover 301 is mounted on the optical box 219, and has its one end adjoining the surface l and its other end adjoining the surface n. The surface n is inclined in the −Z-axis direction and an −X-axis direction (direction opposite to the X-axis direction), and has its one end adjoining the surface m and its other end adjoining the adjacent recess portion 310 in the sealing portion 305A. The height of the surface l of the sealing portion 305C (the height in the −Z-axis direction (the direction of the optical box 219) from the bottom surface, on the side of the upper cover 301, of the sealing member 305) is greater than the height of the surface b of the projection portion 307 in the sealing portion 305A (the height in the −Z-axis direction from the bottom surface, on the side of the upper cover 301, of the sealing member 305).

(State of Sealing Member when Upper Cover is Mounted on Optical Box)

Figure 6:
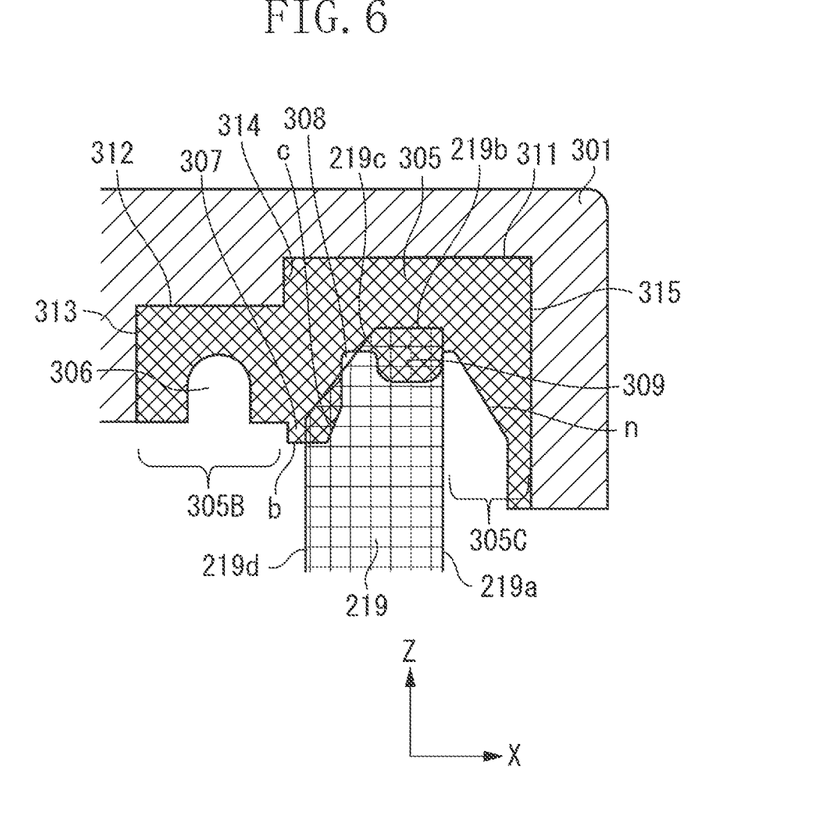
FIG. 6 is a cross-sectional view illustrating a state where the optical box and the sealing member are in contact with each other when the upper cover is mounted on the optical box according to an exemplary embodiment.

FIG. 6 is a schematic view illustrating a cross section in the widthwise direction of the sealing member 305 provided in the upper cover 301 with the sealing member 305 and surfaces 219b and 219c of a sidewall forming an outer peripheral edge of the optical box 219 abutting on (contacting) each other when the upper cover 301 is mounted on the optical box 219. As illustrated in FIG. 6, the optical box 219 has four surfaces 219a, 219b, 219c, and 219d. The surface 219a is a wall surface facing the outside of the optical box 219. The surface 219b is a surface adjacent to the surface 219a and a top surface as a leading end of the outer peripheral edge, opposing the upper cover 301, of the optical box 219. The surface 219c is a surface adjacent to the surface 219b and a surface inclined in the −X-axis direction and the −Z-axis direction (a surface inclined toward the inside of the optical box 219). The surface 219d is a surface adjacent to the surface 219c and a surface facing the inside of the optical box 219.

As illustrated in FIG. 6, the projection portions 309 and 307 in the sealing portion 305A (see, FIG. 5A) respectively abut on the surfaces 219b and 219c of the optical box 219. On the other hand, the recess portion 308 provided between the projection portion 309 and the projection portion 307 does not abut on (contact) the surfaces 219b and 219c of the optical box 219, and the projection portions 307 and 309 and the surface 219c of the optical box 219 forms a sealed portion (closed portion or a closed space). When the upper cover 301 is mounted on the optical box 219, the surface 219b of the optical box 219 is guided in the +Z-axis direction, i.e., toward the projection portion 309 in the sealing portion 305A along a slope of the surface n as an inclined surface of the sealing portion 305C. As a result, the surface 219b of the optical box 219 abuts on the projection portion 309, and the projection portion 309 is elastically deformed by being pressed in the +Z-axis direction by the surface 219b of the optical box 219. The surface 219c of the optical box 219 abuts on the surfaces b and c of the projection portion 307 in the sealing portion 305A, and the surfaces b and c of the projection portion 307 are elastically deformed by being pressed in the +Z-axis direction and the −X-axis direction. The sealing member 305 and the sidewall of the optical box 219 enter an abutment state illustrated in FIG. 6, i.e., a state where the surfaces 219b and 219c of the optical box 219 are press into the sealing member 305 and the projection portions 309 and 307 in the sealing portion 305A are elastically deformed. As a result, the surface 219c of the optical box 219, the projection portions 307 and 309, and the recess portion 308 form a closed space.

When the upper cover 301 is mounted on the optical box 219, the projection portions 307 and 309 in the sealing portion 305A are pressed from the surfaces 219b and 219c of the optical box 219 so that a repulsive force is generated in the sealing portion 305A. The generated repulsive force is applied in the X-axis direction and the Z-axis direction. However, when the upper cover 301 is deformed by the repulsive force in the Z-axis direction, a gap occurs between the upper cover 301 and the optical box 219, affecting a dust-proof performance. In the present exemplary embodiment, providing the groove 306 to the sealing portion 305B adjacent to the sealing portion 305A enables the volume corresponding to compression due to elastic deformation in the X-axis direction of the sealing portion 305A to escape into the groove 306 (hereinafter referred to as volume escape). As a result, the repulsive force is distributed so that the repulsive force in the Z-axis direction is converted into the repulsive force in the X-axis direction.

The upper cover 301 is molded so that the first bottom portion 311 is positioned on an extension of the sidewall of the optical box 219. Further, the upper cover 301 is molded so that the second bottom portion 312 is positioned inside the first bottom portion 311 and the sidewall of the optical box 219. The step 314 is formed between the first bottom portion 311 and the second bottom portion 312. Accordingly, the area where the sealing member 305 and the upper cover 301 adhere to each other becomes larger than the corresponding area in a configuration in which the first bottom portion 311 and the second bottom portion 312 lie in the same plane, by an amount corresponding to the provided step 314. In this manner, adhesiveness between the sealing member 305 and the upper cover 301 is improved, so that separation of the sealing member 305 from the upper cover 301 can be prevented.

Thus, the groove 306 prevents the gap between the optical box 219 and the upper cover 301 from occurring as a result of the deformation of the upper cover 301. Therefore, the tightness of the sealing of the optical box 219 and the dust-proof performance can be prevented from deteriorating.

The separation of the sealing member 305 serving as the dust-proof member injection-molded into the upper cover 301 can be prevented.

While aspects of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-176860, filed Sep. 8, 2015, which is hereby incorporated by reference herein in its entirety.

What is claimed is:
1. An optical scanning device comprising:
a light source configured to emit a light beam;

a rotating polygonal mirror configured to deflect the light beam emitted from the light source so that the light beam deflected by the rotating polygonal mirror scans a photosensitive member;

an optical member configured to guide the light beam deflected by the rotating polygonal mirror to the photosensitive member;

an optical box to which the light source is attached and configured to contain the rotating polygonal mirror and the optical member;

a cover configured to cover an opening of the optical box; and a fixing unit configured to fix the cover to the optical box, wherein the cover includes a dust-proof member injection-molded into the cover to prevent dust from entering the optical box and sandwiched between the cover fixed to the optical box by the fixing unit and a top of a sidewall of the optical box, and wherein the cover includes an inner peripheral wall, an outer peripheral wall, and a bottom portion connecting the inner peripheral wall and the outer peripheral wall, the inner peripheral wall and the outer peripheral wall forming a flow path for injection-molding the dust-proof member, the bottom portion including a first bottom portion, a second bottom portion shallower than the first bottom portion, and a connection surface connecting the first bottom portion and the second bottom portion, wherein the dust-proof member is injection-molded into the cover such that the flow path is filled with the dust-proof member and that a part of the dust-proof member is in contact with the connection surface.

2. The optical scanning device according to claim 1, wherein the cover is molded so that the first bottom portion is positioned on an extension of the sidewall of the optical box in a state where the cover is attached to the optical box.

3. The optical scanning device according to claim 1, wherein the flow path is provided over the entire periphery of the cover.

4. The optical scanning device according to claim 1, wherein the fixing unit is a snap fit.

5. The optical scanning device according to claim 1, wherein the fixing unit is a screw.

6. A cover attached to an optical box included in an optical scanning device, and configured to cover an opening of the optical box, the cover comprising:

a fixing unit configured to fix the cover to the optical box;

a dust-proof member injection-molded into the cover to prevent dust from entering the optical box and sandwiched between the cover fixed to the optical box by the fixing unit and a top of a sidewall of the optical box;

an inner peripheral wall;

an outer peripheral wall; and a bottom portion connecting the inner peripheral wall and the outer peripheral wall, the inner peripheral wall and the outer peripheral wall forming a flow path for injection-molding the dust-proof member, the bottom portion including a first bottom portion, a second bottom portion shallower than the first bottom portion; and a connection surface connecting the first bottom portion and the second bottom portion, wherein the dust-proof member is injection-molded into the cover such that the flow path is filled with the dust-proof member and that a part of the dust-proof member is in contact with the connection surface.

7. The cover according to claim 6, wherein the cover is molded so that the first bottom portion is positioned on an extension of the sidewall of the optical box in a state where the cover is attached to the optical box.

8. The optical scanning device according to claim 6, wherein the flow path is provided over the entire periphery of the cover.

9. The optical scanning device according to claim 6, wherein the fixing unit is a snap fit.

10. The optical scanning device according to claim 6, wherein the fixing unit is a screw.

* * * * *